United States Patent [19]

Gore

[11] Patent Number: 5,372,182

[45] Date of Patent: Dec. 13, 1994

[54] MODULAR REGENERATOR PRE-CONDITIONER AIR SYSTEM

[76] Inventor: Thomas L. Gore, 25 Renwick Dr., Poland, Ohio 44514

[21] Appl. No.: 65,764

[22] Filed: May 24, 1993

[51] Int. Cl.⁵ ............................................. F28D 19/00
[52] U.S. Cl. ............................................ 165/7; 165/9; 165/54; 165/137
[58] Field of Search .................... 165/137, 7, 8, 54, 9

[56] References Cited

U.S. PATENT DOCUMENTS

| | | |
|---|---|---|
| 3,165,625 | 1/1965 | Potter . |
| 3,977,466 | 8/1976 | Johansson . |
| 4,646,817 | 3/1987 | Van Ee ............................ 165/137 |
| 5,183,098 | 2/1993 | Chagnot ........................... 165/54 |

FOREIGN PATENT DOCUMENTS 2533682   3/1984   France ............................ 165/137

*Primary Examiner*—Albert W. Davis, Jr.
*Attorney, Agent, or Firm*—Harpman & Harpman

[57] ABSTRACT

A modular recuperator apparatus and method that is used to pre-condition air treatment in a HVAC and air processing systems. A modular recuperating system enhances the overall efficiency of modern HVAC systems by reducing the required relative treatment of air within the system by supplying pre-conditioned fresh air into the system.

4 Claims, 2 Drawing Sheets

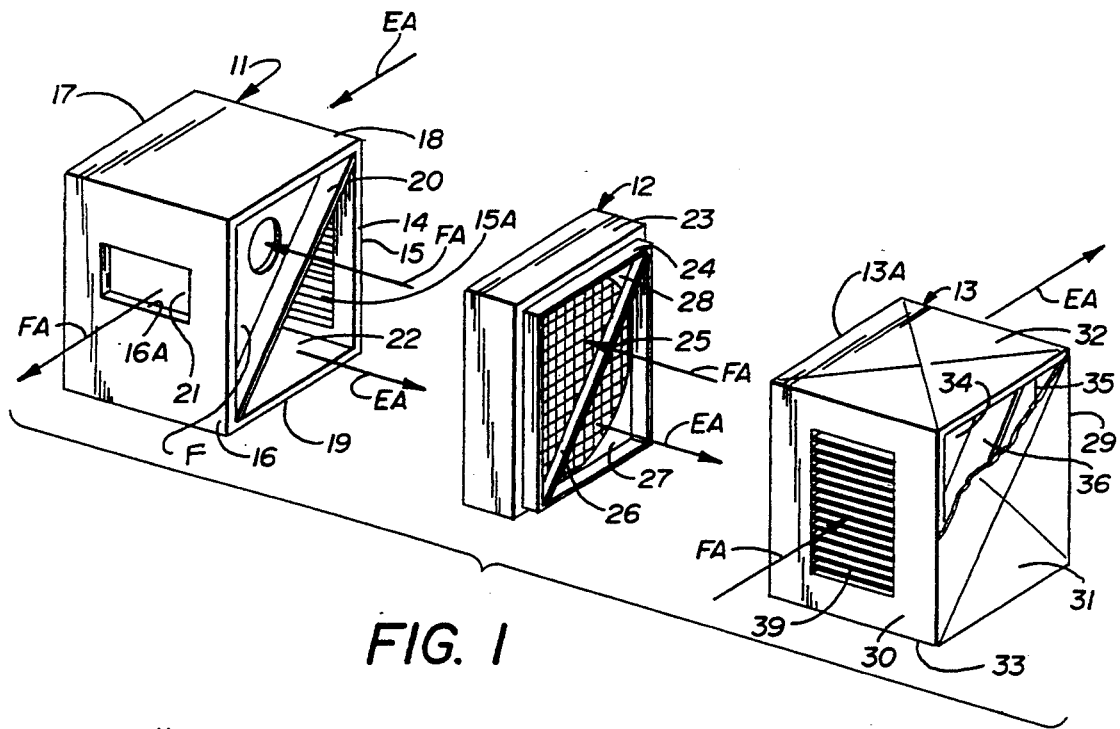
FIG. 1
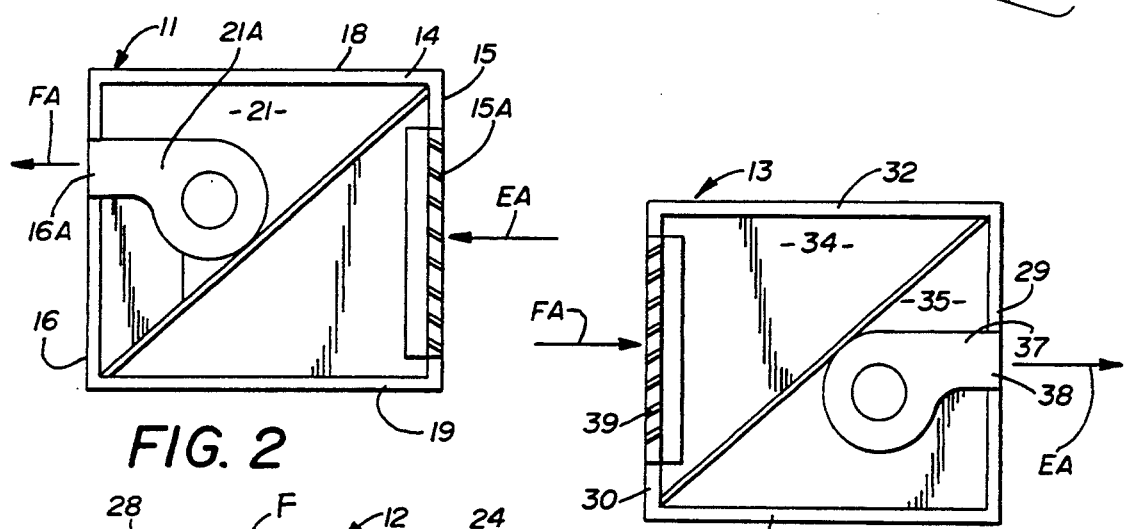
FIG. 2
FIG. 3
FIG. 4

MODULAR REGENERATOR PRE-CONDITIONER AIR SYSTEM

BACKGROUND OF THE INVENTION

1. Technical Field

This device and method relates to heating and cooling systems for modern structures that add pre-conditioned fresh air by a unique modular conditioner.

2. Description of Prior Art

Prior art devices of this type have relied on a variety of different designs that utilize typical HVAC components and regenerator to add pre-conditioned fresh air to an enclosed structure. Current components and installation method require a custom, one at a time design and assembly approach of each apparatus for each job. Existing component designs prevent mass production of standardized products for use on all related applications. Regenerators work on temperature and vapor pressure differentials between interior structure exhaust air and fresh air. Typical units of this type transfer 75% of this difference, see for example U.S. Pat. Nos. 3,977,466 and 3,165,625.

In U.S. Pat. No. 3,977,466 a room air-conditioning apparatus is disclosed that exchanges heat or moisture between fresh outside air and conditioned exhaust air from inside the building or room enclosure. The apparatus uses an exchange rotor and a blower. Exhaust building air is drawn into a chamber by the enclosed blower supplying same to the exchange rotor that transfers relative heat or cold to fresh make-up air entering the other side of the rotor by a supply fan.

In U.S. Pat. No. 3,165,265 a heating ventilation device is shown wherein multiple blowers are secured to a single drive shaft and are disposed at an angular inclination within a enclosed cabinet. Heating elements are positioned below the blowers and heat outside air that is drawn in through the unit.

SUMMARY OF THE INVENTION

A modular regenerator apparatus and installation system that is used to pre-condition fresh make-up air in an HVAC air treatment installation. The modular component design allows for a variety of adaptive installation configurations to meet job requirements with the use of standardized interchangeable modular components that are divided in a unique triangular configuration.

DESCRIPTION OF THE DRAWINGS

FIG. 1 is an exploded perspective view of the modular component units of the regenerator system;

FIG. 2 is an enlarged side plan view of an inlet blower module;

FIG. 3 is an enlarged side plan view of an exhaust blower module unit;

FIG. 4 is an enlarged side plan view of a regenerator module unit;

DESCRIPTION OF THE PREFERRED EMBODIMENT

Figure 5:
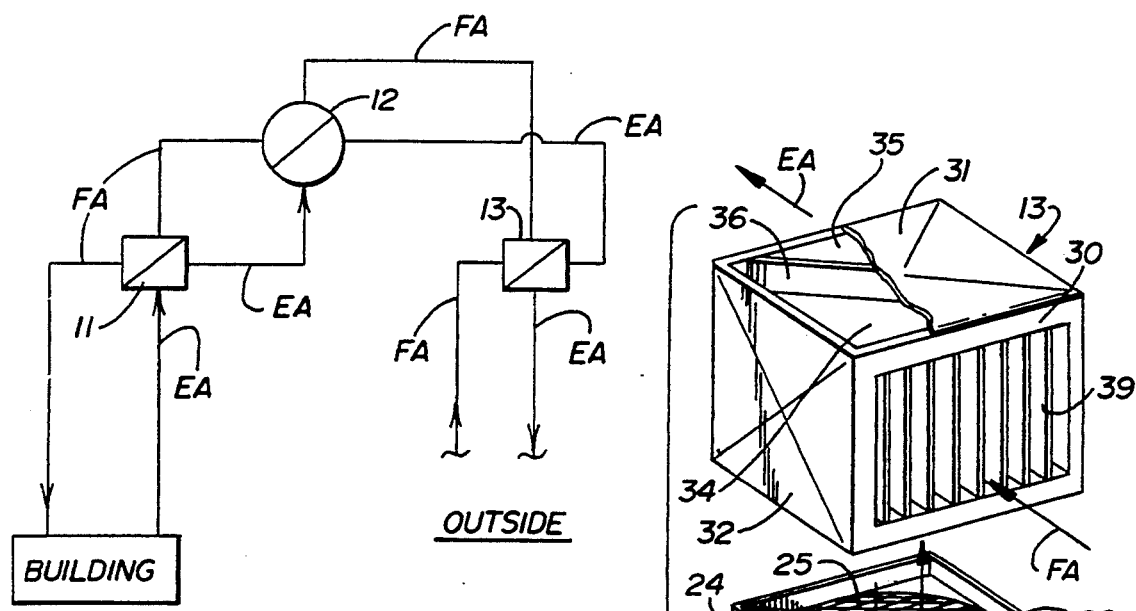
FIG. 5 is a schematic view showing the air flow path through a modular regenerator system.

Referring now to FIGS. 1–3 of the drawings, a modular regenerator system can be seen comprising an exhaust inlet air module 11, a regenerator module 12 and a fresh inlet air module 13. The exhaust air module 11 comprises a sheet metal cabinet 14 having a front wall 15, a rear wall 16 and side wall 17, with a top 18 and a bottom 19 in this embodiment configuration. The sheet metal cabinet 14 is divided triangularly by an interior partition 20 extending between said front and rear walls 15 and 16 respectively at an angularly inclination therebetween.

The inner partition 20 defines a blower chamber 21 and an exhaust air inlet chamber 22 which would be in communication with a structure (not shown). The blower chamber 21 has a blower 21A and an apertured closure partition 23 as best seen in FIG. 1 of the drawings. The front wall 15 has a structure air inlet at 15A through which exhaust air from the structure (not shown) is supplied illustrated by the adjacent arrow EA. The rear wall 16 has a fresh air outlet 16A that supplies the structure (not shown) with pre-conditioned fresh air.

Referring now to FIGS. 1–4 of the drawings, the regenerator module 12 can be seen comprising a support frame F having areas of reduced diameter at 24. The support frame F defines a regenerator chamber in which is positioned a self-contained rotating exchange rotor 25 as will be well known and understood by those skilled in the art.

Areas of reduced dimension at 24 divided triangularly by respective partitions 26 defining two equal triangular chambers 27 and 28.

Referring now to FIGS. 1–3 of the drawings, the fresh air inlet module 13 can be seen comprising a sheet metal cabinet 13A having a front wall 29, a rear wall 30, a side wall 31, top wall 32 and a bottom 33. The sheet metal cabinet 13A is also divided into two equal triangular chambers 34 and 35 by an inner angularly positioned partition 36.

This critical aspect of this invention is in the triangular division of the exhaust inlet air module 11 and the fresh air inlet module 13 that allows for a compact modular design thereof which is the critical improvement of the invention over prior art.

The triangular division of the respective modules necessitates the similar division configuration of the hereinbefore described regenerator module 12.

Referring back now to the fresh inlet air module 13 of the triangular chamber 35 has an exhaust air blower 37 that pulls exhaust air through the regenerator system of the invention and exits same to atmosphere via a blower exhaust outlet indicated at 38.

Conversely, fresh make-up air indicated by flow arrows at FA is drawn through the regenerator system of the invention in the reverse direction, through the fresh air inlet 39 in the front wall 20 of the fresh air inlet module 13, through said triangular chamber 34 and the respective triangular chamber 26 of the regenerator module 12 and the interconnected blower chamber 21 by the blower 21A in the exhaust inlet air module 11 thereby supplying treated fresh air to the structure (not shown) via a blower outlet 16A.

Referring now to FIG. 5 of the drawings an air flow schematic can be seen that illustrates the exhaust and fresh air flow path through the regenerator system. Building air BA is drawn into the exhaust inlet air module 11, through the regenerator module 12 and exhausted to atmosphere (outside) through the fresh air inlet module 13.

Conversely, fresh air FA follows the reverse path through the regenerator system as hereinbefore described.

Figure 6:
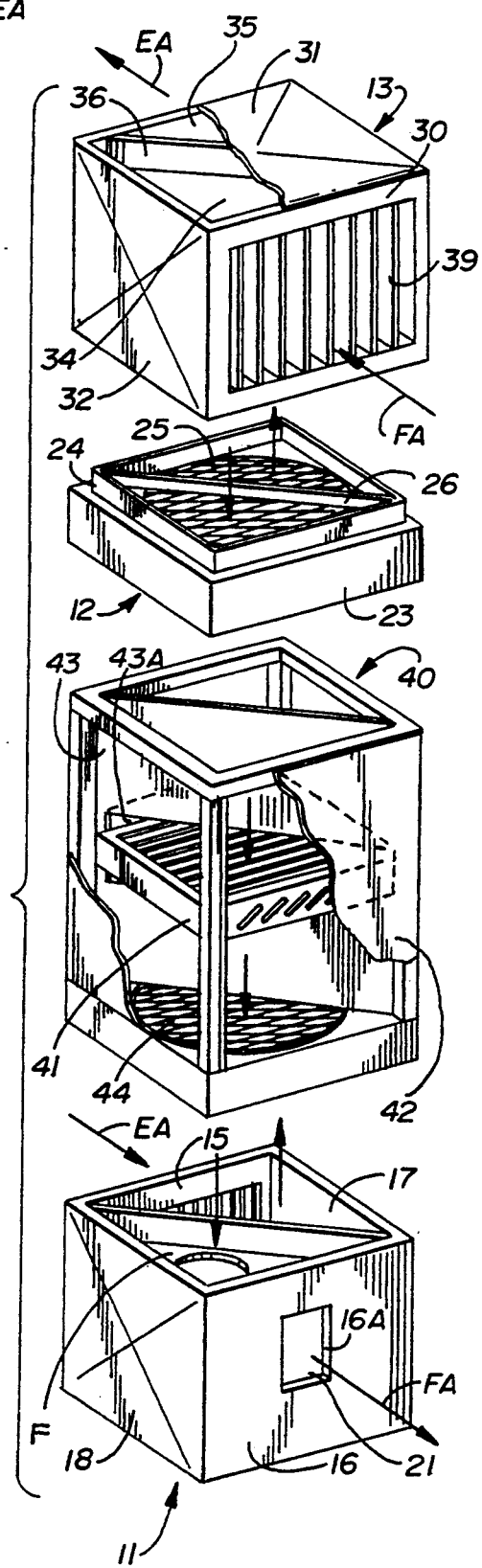
FIG. 6 is an exploded perspective view of an alternate modified assembly of component modular units with additional heating or cooling coils contained within.

An alternate or modified version of the regenerator system modules can be seen in FIG. 6 of the drawings wherein an assembly insert module 40 is used to supplement the basic regenerator system. The assembly insert module 40 provides improved treatment of the make-up fresh air by introducing a conditioning coil 41 between the respective fresh air and exhaust air modules 11 and 13. The accessory insert module 40 comprises a cabinet 42 that is divided triangularly by a partition 43 to match the air flow paths hereinbefore defined. The conditioning coil 41 is positioned within a well at 43A within the triangular partition 43 closed off from the exhaust air flow path and in air flow communication with the respective fresh air module 13 and is used as a heating-/cooling coil dependent on the seasonal requirements.

A second heat exchange rotor 44 in its own mounting frame 45 is positioned (in this example) at one end of said cabinet 42 to increase the overall efficiency of the system.

The addition of the assembly insert module 40 is used in this example to illustrate the variety of different modular configurations that can be achieved by use of the triangular divided modules 11, 12, and 13 as hereinbefore described.

It will thus be seen that an improvement to a regenerator air treatment system has been illustrated and described and that it will be apparent to those skilled in the art that various changes and modifications may be made therein without departing from the spirit of the invention, therefore

I claim:

1. An improvement in a regenerator system that exchanges fresh atmospheric air for exhaust air from an enclosed area through an air exchange medium that transfers the relative properties of exhaust contaminated air to the fresh atmospheric air added to the system, comprising: an exhaust air module having outside side walls; an inlet air module having two outside side walls; a regenerator module interposed between said inlet air module and said exhaust air module and communicating with said modules, said regenerator module including two outside side walls, each of said inlet, exhaust and regenerator modules further including a top wall, a bottom wall, and a front wall, said top, bottom and side walls intersecting to form corners and said walls cooperating to define an internal volume, each of said modules further having located in said internal volume an air-impervious partition wall extending from one corner of the module to an opposite corner and dividing the module internal volume into first and second triangular compartments which are independent of each other and which are separated from each other by said partition wall, each of said inlet and exhaust modules further including a fresh air flow opening defined in one outside side wall on one side of said partition wall and an exhaust air flow opening in the other outside side wall on an opposite side of said partition wall so that said partition wall in each of said inlet and exhaust modules is located between said flow openings and separates them from each other; the first triangular compartment of said inlet air module being aligned with the first triangular compartment of said regenerator module and the first triangular compartment of said exhaust air module, and the second triangular compartment of said inlet air module being aligned with the second triangular compartment of said regenerator module and the second triangular compartment of said exhaust air module, said aligned compartments defining a fresh air flow path and an exhaust air flow path, a fan mounted in said inlet module and in said exhaust module to move air through said fresh air flow path and said exhaust air flow path.

2. The improvement in a regenerator system of claim 1 wherein said exhaust inlet air module and said fresh inlet air module are interchangeable with one another by inversion of same.

3. The improvement in a regenerator system of claim 1 wherein said regenerator module contains a heat exchange wheel extending between said triangular chambers within said recuperator module.

4. The improvement in a regenerator system of claim 1 further including in each of said air flow paths comprises a blower in one of said respective compartments within each of said exhaust and fresh air inlet air modules.

* * * * *